United States Patent
Zhang et al.

(10) Patent No.: US 12,292,573 B2
(45) Date of Patent: May 6, 2025

(54) FOCAL LENGTH ADJUSTMENT METHOD, DEVICE, APPARATUS AND COMPUTER READABLE STORAGE MEDIUM FOR AR GLASSES

(71) Applicant: GOERTEK INC., Shandong (CN)

(72) Inventors: Qingkai Zhang, Shandong (CN); Pingping Wang, Shandong (CN); Jinjie Zhang, Shandong (CN); Lihua Lu, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/552,204

(22) PCT Filed: Nov. 2, 2021

(86) PCT No.: PCT/CN2021/128064
§ 371 (c)(1),
(2) Date: Sep. 25, 2023

(87) PCT Pub. No.: WO2023/040013
PCT Pub. Date: Mar. 23, 2023

(65) Prior Publication Data
US 2024/0053613 A1    Feb. 15, 2024

(30) Foreign Application Priority Data
Sep. 14, 2021 (CN) .......................... 202111083587.3

(51) Int. Cl.
*G02B 27/01* (2006.01)
*G06T 19/00* (2011.01)
*H04N 23/67* (2023.01)

(52) U.S. Cl.
CPC ........ *G02B 27/0172* (2013.01); *G06T 19/006* (2013.01); *H04N 23/67* (2023.01); *G02B 2027/0178* (2013.01)

(58) Field of Classification Search
CPC ............ G02B 27/0093; G02B 27/0172; G02B 27/0179; G02B 27/0081; G02B 27/0101;
(Continued)

(56) References Cited

U.S. PATENT DOCUMENTS 6,614,408 B1    9/2003   Mann
6,616,277 B1 *  9/2003   Davenport .......... A61B 3/1176
                                                        351/221
(Continued)

FOREIGN PATENT DOCUMENTS

CN        106802486 A      6/2017
CN        207181829 U      4/2018
(Continued)

OTHER PUBLICATIONS

International Search Report from International Application No. PCT/CN2021/128064 mailed Jun. 10, 2022.

*Primary Examiner* — Dong Hui Liang
(74) *Attorney, Agent, or Firm* — Shih IP Law Group, PLLC

(57) ABSTRACT

The present application discloses a focal length adjustment method, device, apparatus and computer readable storage medium for AR glasses, the method includes: receiving a focal length adjustment command, and displaying a preset circle with a preset reference radius through a display module; capturing a first image of the preset circle in an eye of a wearer of the AR glasses through the camera to obtain a first captured image, and determining a first imaging radius of the preset circle in the first image according to the first captured image; determining target diopter of the eye of the wearer according to the preset reference radius and the first imaging radius; and determining a target deflecting angle of (Continued)

the display module according to the target diopter, and adjusting the display module according to the target deflecting angle.

9 Claims, 2 Drawing Sheets

(58) Field of Classification Search
CPC .. G02B 27/017; G02B 27/0176; G02B 27/30; G02B 2027/0185; G02B 2027/0138; G02B 2027/014; G02B 2027/0187; G02B 2027/0141; G02B 2027/0134; G02B 2027/0129; G02B 2027/0112; G02B 2027/0118; G02B 2027/0174; G02B 2027/0178; G02B 3/14; G02B 30/00; G02B 7/284; G02B 7/08; G02B 17/06; G02B 21/0032; G02B 5/10; G06F 3/013; G06F 3/011; G06F 3/04842; G06F 3/0346; G06F 3/147; G06F 3/167; G06F 1/163; G02F 1/29; G02F 1/134336; G02F 1/13471; G02F 1/291; G02F 1/294

See application file for complete search history.

(56) References Cited

U.S. PATENT DOCUMENTS

| | | | |
|---|---|---|---|
| 2011/0157550 A1* | 6/2011 | Chen | A61B 3/145 |
| | | | 351/246 |
| 2016/0270656 A1* | 9/2016 | Samec | A61B 3/1015 |
| 2019/0004281 A1* | 1/2019 | Shi | G02B 7/021 |
| 2020/0348523 A1 | 11/2020 | Stevens et al. | |
| 2020/0379214 A1 | 12/2020 | Lee et al. | |
| 2022/0058999 A1* | 2/2022 | Vleugels | G09G 3/02 |

FOREIGN PATENT DOCUMENTS

| | | | | |
|---|---|---|---|---|
| CN | 108474960 A | | 8/2018 | |
| CN | 111665638 A | * | 9/2020 | ............ G02B 15/04 |
| CN | 113359297 A | | 9/2021 | |
| WO | 2021055278 A2 | | 3/2021 | |

* cited by examiner

FOCAL LENGTH ADJUSTMENT METHOD, DEVICE, APPARATUS AND COMPUTER READABLE STORAGE MEDIUM FOR AR GLASSES

The present application claims priority from Chinese patent application No. 202111083587.3 filed to the China National Intellectual Property Administration (CNIPA) on Sep. 14, 2021, titled "FOCAL LENGTH ADJUSTMENT METHOD, DEVICE, APPARATUS AND COMPUTER READABLE STORAGE MEDIUM FOR AR GLASSES", the entire contents of which are incorporated herein by reference.

TECHNICAL FIELD

The application relates to the technical field of intelligent glasses, particularly, to a focal length adjustment method, device, apparatus and computer readable storage medium for AR glasses.

BACKGROUND TECHNOLOGY

Augmented Reality technology is a technology that skillfully integrates virtual information with the real world, it widely adopts various technologies, such as multimedia, 3D modeling, real-time tracking and registration, intelligent interaction, and sensing. After simulating the virtual information such as text, image, 3D modeling, music and video generated by a computer, they are applied to the real world. The virtual information and the real world are combined together, so as to realize the "enhancement" of the real world.

The final form of AR product is glasses, which is convenient for users to wear on, light enough in weight, fashionable enough in appearance, and has both electronic and fashion attributes. However, the existing AR glasses cannot support users to customize their own products according to their actual myopia or farsightedness degree. Therefore, when users wear the existing AR glasses, there will be a wearing conflict with the current myopia or hyperopia glasses, which is similar to the case that when we watch 3D movies, we wear a pair of 3D glasses outside the myopia or hyperopia glasses, and thereby the user experience is very poor.

SUMMARY

The main purpose of the present application is to provide a focal length adjustment method, device, apparatus and computer readable storage medium for AR glasses, to solve the technical problem of the conflict between the wearing of AR glasses and the wearing of myopia or hyperopia glasses.

In order to achieve the above purpose, the present application provides a focal length adjustment method for AR glasses. The focal length adjustment method for AR glasses is applied to AR glasses, and the AR glasses include a display module and a camera. The focal length adjustment method for AR glasses includes: receiving a focal length adjustment command, and displaying a preset circle with a preset reference radius through the display module; capturing a first image of the preset circle in an eye of a wearer of the AR glasses through the camera to obtain a first captured image, and determining a first imaging radius of the preset circle in the first image according to the first captured image; determining target diopter of the eye of the wearer according to the preset reference radius and the first imaging radius; and determining a target deflecting angle of the display module according to the target diopter, and adjusting the display module according to the target deflecting angle.

Optionally, the display module includes two waveguide plates, and determining a target deflecting angle of the display module according to the target diopter, and adjusting the display module according to the target deflecting angle includes: determining a target virtual image distance according to the target diopter; and determining a target deflecting angle of the waveguide plates according to the target virtual image distance, and adjusting the waveguide plates according to the target deflecting angle.

Optionally, determining a target deflecting angle of the waveguide plates according to the target virtual image distance, and adjusting the waveguide plates according to the target deflecting angle includes: determining a minimum distance between the two waveguide plates, widths of the waveguide plates, and light exiting angles of the waveguide plates; determining the target deflecting angle of the waveguide plates according to the minimum distance, the widths, the light exiting angles and the target virtual image distances; and controlling the waveguide plates to deflect by the target deflecting angle towards the eye of the wearer based on proximal ends of the waveguide plates, wherein the proximal ends of the waveguide plates are respective nearer ends of either of the waveguide plates to the other of the waveguide plates.

Optionally, determining a target deflecting angle of the waveguide plates according to the target virtual image distance, and adjusting the waveguide plates according to the target deflecting angle includes: determining a first distance between central light exiting points of the two waveguide plates and light exiting angles of the waveguide plates; determining the target deflecting angle of the waveguide plates according to the first distance, the light exiting angles and the target virtual image distance; and controlling the waveguide plate to deflect by the target deflecting angle towards the eye of the wearer based on the central light exiting point of the waveguide plate.

Optionally, the display module includes an optical engine, and determining a target deflecting angle of the display module according to the target diopter, and adjusting the display module according to the target deflecting angle includes: determining a target virtual image distance according to the target diopter; and determining a target deflecting angle of the optical engine according to the target virtual image distance, and adjusting the optical engine according to the target deflecting angle.

Optionally, the display module includes two waveguide plates, and determining a target deflecting angle of the optical engine according to the target virtual image distance, and adjusting the optical engine according to the target deflecting angle includes: determining a first distance between central light exiting points of the two waveguide plates and deflecting angles of the waveguide plates; determining a target deflecting angle of the optical engine according to the first distance, the deflecting angles and the target virtual image distance; and adjusting the optical engine according to the target deflecting angle.

Optionally, after determining a target deflecting angle of the display module according to the target diopter, and adjusting the display module according to the target deflecting angle, the focal length adjustment method for AR glasses further includes: capturing a second image of the preset circle in the eye of the wearer of the AR glasses through the camera to obtain a second captured image, and determining a second imaging radius of the preset circle in the second image according to the second captured image; if a difference between the second imaging radius and the preset reference radius is greater than or equal to a preset error threshold, determining a second diopter according to the second imaging radius and the preset reference radius, determining a second deflecting angle of the display module according to the second diopter, and adjusting the display module according to the second deflecting angle until the difference between the second imaging radius and the preset reference radius is less than the preset error threshold.

In order to achieve the above purpose, the present application further provides a focal length adjustment device for AR glasses, wherein the focal length adjustment device for AR glasses includes: a display module configured to receive a focal length adjustment command and to display a preset circle with a preset reference radius; a capturing module configured to capture a first image of the preset circle in an eye of a wearer of AR glasses through a camera to obtain a first captured image, and to determine a first imaging radius of the preset circle in the first image according to the first captured image; a diopter determination module configured to determine a target diopter of the eye of the wearer according to the preset reference radius and the first imaging radius; and an adjustment module configured to determine a target deflecting angle of the display module according to the target diopter, and to adjust the display module according to the target deflecting angle.

In order to achieve the above purposes, the present application further provides a focal length adjustment apparatus for AR glasses, wherein the focal length adjustment apparatus for AR glasses includes a memory, a processor, and a focal length adjustment program for AR glasses stored in the memory and operable on the processor. Here, the focal length adjustment program for AR glasses, when executed by a processor, implements steps of the focal length adjustment method for AR glasses described above.

In addition, in order to achieve the above purposes, the present application further provides a computer readable storage medium, wherein a focal length adjustment program for AR glasses is stored in the computer readable storage medium. Here, the focal length adjustment program for AR glasses, when executed by the processor, implements steps of the focal length adjustment method for AR glasses as described above.

In the present application, the display module displays a preset circle with a preset reference radius by receiving a focal length adjustment command; capturing the first image of the preset circle in the eyes of the wearer of the AR glasses through the camera to obtain a first captured image; determining the first imaging radius of the preset circle in the first image according to the first captured image; determining the target diopter of the eyes of the wearer according to the preset reference radius and the first imaging radius; and determining the target deflecting angle of the display module according to the target diopter and adjusts the display module according to the target deflecting angle. The method of the present application uses the display module and the camera of the AR glasses to determine the user's diopter, and then adjusts the deflecting angle of the display module, so that a clear imaging requirement of users can be satisfied without wearing myopia or hyperopia glasses, and the problem of conflict between the wearing of AR glasses and the wearing of myopia or hyperopia glasses may be avoided.

The purpose realization, functional features and advantages of the present application will be further described with reference to the attached drawings in combination with embodiments.

DETAILED DESCRIPTION OF EMBODIMENTS

It should be understood that the specific embodiments described herein are only used to explain the embodiments of the present disclosure, but the present disclosure is not limited thereto.

Based on the above structure, various embodiments of the focal length adjustment method for AR glasses are provided.

Figure 1:
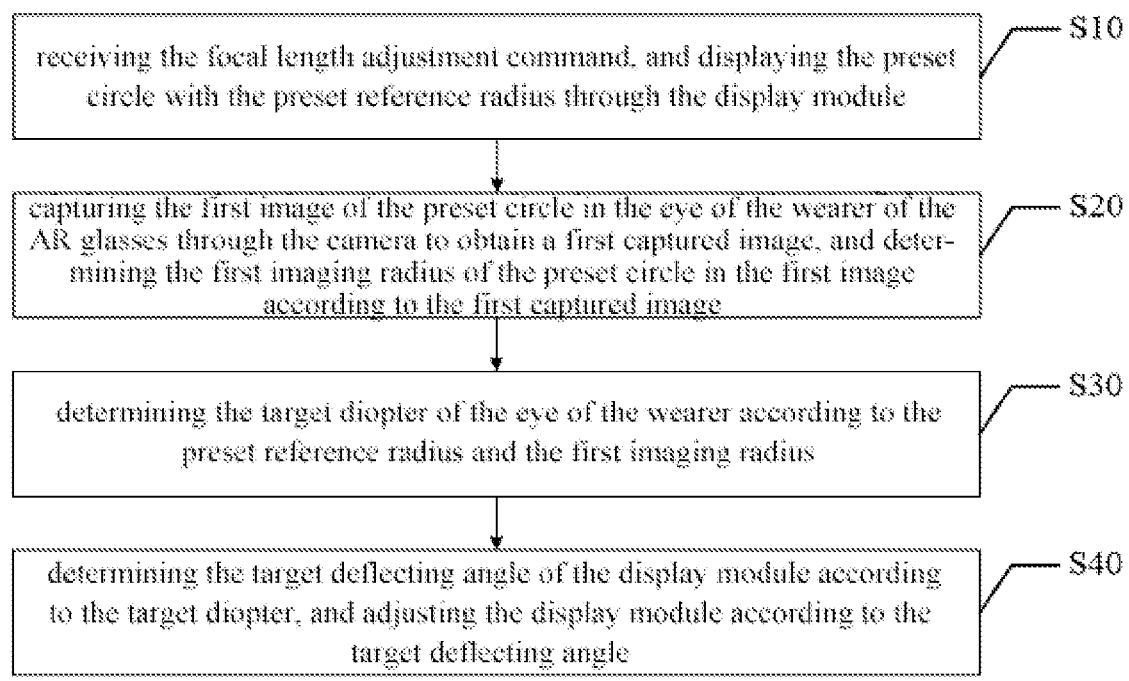
FIG. 1 is an exemplary flow chart of the first embodiment of the focal length adjustment method for AR glasses of the present application.

Referring to FIG. 1, FIG. 1 is an exemplary flow chart of the first embodiment of the focal length adjustment method for AR glasses of the present application.

The first embodiment of the present application provides a focal length adjustment method for AR glasses. It should be understood that although the steps are shown in sequence in the flow chart, in some cases, the steps can be performed in a sequence different from the sequence as shown or described herein. In this embodiment, the focal length adjustment method for AR glasses is applied to AR glasses. The AR glasses includes a display module and a camera. In this embodiment, the focal length adjustment method for AR glasses includes the following steps.

Step S10, receiving the focal length adjustment command, and displaying the preset circle with the preset reference radius through the display module.

In this embodiment, the focal length adjustment command can be manually triggered by the user after wearing the AR glasses or automatically triggered by the AR glasses. Specifically, the focal length adjustment command can be triggered when it is detected that the AR glasses are in a worn state. Here, the wearing state of AR glasses may be detected by at least one of the pressure sensors, biosensors, and distance sensors on the AR glasses, or may be detected by the images captured by the camera on the AR glasses. The embodiment is not limited thereto.

The display module projects and displays the image of the preset circle with the preset reference radius if the focal length adjustment command is received.

Step S20, capturing the first image of the preset circle in the eye of the wearer of the AR glasses through the camera to obtain a first captured image, and determining the first imaging radius of the preset circle in the first image according to the first captured image.

The projected and displayed image of the preset circle can be formed in the eye of the wearer of AR glasses. It can be understood that, since the degrees of myopia or hyperopia of different wearers' eyes are different, even if the images are projected and displayed with the preset circle having the same size, the size of the image formed in the eyes of the wearer may also be different. Therefore, the degree of myopia or hyperopia of the eyes of the wearer can be determined by the size of the image formed in the wearer's glasses, and the degree of myopia or hyperopia can be indicated by diopter.

Specifically, the camera of AR glasses captures the image (hereinafter referred to as the first image only for discriminating) in the eye of the wearer of AR glasses, to obtain the captured image (hereinafter referred to as the first captured image only for discriminating). Since the camera is at a certain distance from the eye of the wearer, and the image captured by the camera may have a certain distortion due to camera's property. That is, there is a difference in size between the circle in the first captured image and the circle in the first image. Therefore, after obtaining the first captured image, it is necessary to determine the first imaging radius of the preset circle in the first image according to the first captured image.

Optionally, before the above step S10, the method may further include the process of calibrating the difference in size between the captured image captured by the camera and the image to be captured. Specifically, a preset circular picture with a preset reference radius is displayed or positioned at the preset distance and preset angle of the camera of AR glasses, and the preset circular picture is captured by the camera to obtain the actual captured image. Here, the preset distance and the preset angle are determined according to the distance and the angle of the eye of the wearer relative to the camera when the AR glasses are wearing by the wearer. Since the size of each pixel in the picture captured by the camera is known, the number of pixels included in the radius of the preset circle in the actual captured image can be determined after the actual captured image is obtained, and the actual capturing radius of the preset circle in the actual captured image can be determined according to the number and the size of pixels included in the actual capturing radius. The ratio between the actual capturing radius and the preset reference radius is configured to indicate the difference in size between the captured image captured by the camera and the image to be captured.

Correspondingly, determining the first capturing radius of the preset circle in the first captured image after the first captured image is obtained. The first imaging radius of the preset circle in the first image may be determined according to the first capturing radius and the ratio of the above actual capturing radius to the preset reference radius. Specifically, if the ratio of the actual capturing radius to the preset reference radius is k, then the first imaging radius equals to the first capturing radius/k.

Step S30, determining the target diopter of the eye of the wearer according to the preset reference radius and the first imaging radius.

After determining the first imaging radius, the target diopter of the wearer's eye can be determined according to the preset reference radius, the first imaging radius and the preset diopter calculation formula, wherein the preset diopter calculation formula is:

$$D=(S_R-S_{R_0})/f.$$

Here, D is diopter, $S_R$ is the first imaging radius, $S_{R0}$ is the preset reference radius, and f is the focal length of the camera.

Optionally, after determining the target diopter of the wearer's eye, the target diopter may be output to allow the wearer to know the degree of myopia or hyperopia of the eye of the wearer.

Step S40, determining the target deflecting angle of the display module according to the target diopter, and adjusting the display module according to the target deflecting angle.

In this embodiment, after determining the target diopter, the target deflecting angle corresponding to the display module can be determined according to the target diopter, and then the deflecting angle of the display module can be adjusted according to the target deflecting angle, so that the image projected and displayed by the display module can be clearly displayed on the wearer's retina.

It can be understood that, the deflecting angle of the display module may be adjusted by adjusting the deflecting angle of the waveguide plate, or adjusting the deflecting angle of the optical engine.

In this embodiment, the display module displays a preset circle with a preset reference radius by receiving the focal length adjustment command; capturing the first image of the preset circle in the eye of the wearer of the AR glasses though the camera to obtain a first captured image; determining the first imaging radius of the preset circle in the first image according to the first captured image; determining the target diopter of the eye of the wearer according to the preset reference radius and the first imaging radius; determining the target deflecting angle of the display module according to the target diopter; and adjusting the display module according to the target deflecting angle. The method of the present application uses the display module and the camera of AR glasses to determine the user's diopter, and then adjusts the deflecting angle of the display module, so that clear imaging can be achieved without wearing myopia or hyperopia glasses, and the problem of conflict between the wearing of AR glasses and the wearing of myopia or hyperopia glasses may be avoided.

Further, a second embodiment of the focal length adjustment method for AR glasses in the present application is provided based on the above-described first embodiment. In this embodiment, the display module includes two waveguide plates.

The above step S40 includes the following steps.

Step A1, determining the target virtual image distance according to the target diopter.

Step A2, determining the target deflecting angle of the waveguide plates according to the target virtual image distance, and adjusting the waveguide plate according to the target deflecting angle.

After determining the target diopter, calculating the reciprocal of the target diopter, i.e., the target virtual image distance. In order to allow the images projected and displayed by the display module to be clearly display on the wearer's retina, it is necessary to make the virtual image distance of the image projected and displayed by the display module equal to the target virtual image distance. The adjustment of the virtual image distance of the image projected and displayed by the display module may be realized by adjusting the deflecting angle of the waveguide plate or adjusting the deflecting angle of the optical engine, and also can be realized by adjusting the waveguide and the optical engine at the same time.

This embodiment is described as adjusting the deflecting angle of the waveguide plate. It should be understood that there are many methods of adjusting the deflecting angle of the waveguide plate, such as adjusting the deflecting angle of the waveguide plate rotating around the proximal end of the waveguide plate, or adjusting the deflecting angle of the waveguide plate around the light exiting point at the center of the waveguide plate.

Further, the above step A2 includes the following steps.

Step A21, determining the minimum distance between the two waveguide plates, the widths of the waveguide plates, and the light exiting angles of the waveguide plates.

Step A22, determining the target deflecting angle of the waveguide plates according to the minimum distance, the widths, the light exiting angles and the target virtual image distance.

Step A23, controlling the waveguide plates to deflect by the target deflecting angle towards the eye of the wearer based on the proximal ends of the waveguide plates. Here, the proximal ends of the waveguide plates are respective nearer ends of either of the waveguide plates to the other of the waveguide plates.

Figure 2:
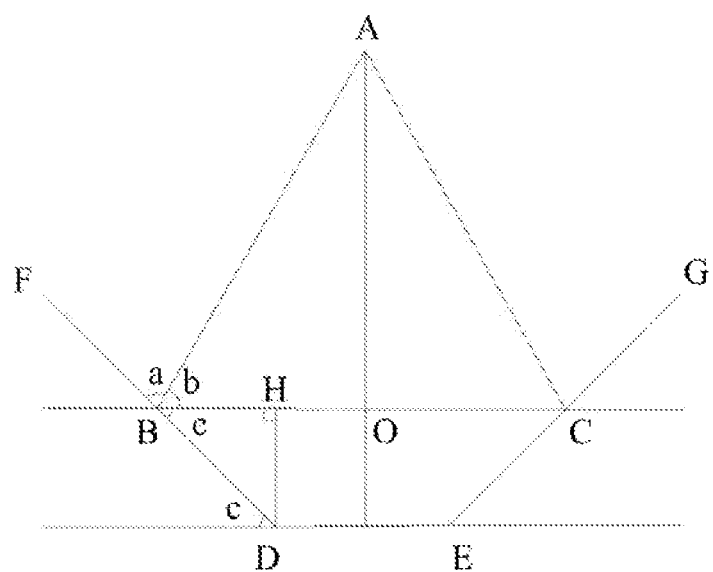
FIG. 2 is a schematic diagram of the deflecting angle of the display module according to the embodiment of the application.

This embodiment is described as adjusting the deflecting angle of the waveguide plate, and the method of adjusting the deflecting angle of the waveguide plate is to deflect around the proximal end of the waveguide plate. As shown in FIG. 2, DF and EG are the widths of the two waveguide plates, B and C are the light exiting point at the centers of DF and EG, DE is the minimum distance between the two waveguide plates, A is the virtual image point, AB and AC are the target virtual image distances, a is the light exiting angle of the waveguide plate, and c is the target deflecting angle of the waveguide plate. In this embodiment case, a, BD, DE and AB are all known values, therefore c may be calculated according to a, BD, DE and AB. Since cos b=BO/AB, and b=180°−a−c, BO=BH+HO=BD*cos c+0.5DE, cos (180°−a−c)=(BD*cos c+0.5DE)/AB. That is, c may be calculated according to these formulas.

After the target deflecting angle c of the waveguide plate is calculated, the waveguide plate DF can be controlled to deflect by the target deflecting angle c towards the eye of the wearer based on the proximal end D of the waveguide plate, and the waveguide plate EG can be controlled to deflect by the target deflecting angle c towards the eye of the wearer based on the proximal end E of the waveguide plate.

Further, the above step A2 includes the following steps.

Step A24, determining the first distance of the central light exiting points of the two waveguide plates and the light exiting angle of the waveguide plate.

Step A25, determining the target deflecting angle of the waveguide plates according to the first distance, the light exiting angles and the target virtual image distance.

Step A26, controlling the waveguide plates to deflect by the target deflecting angle towards the eye of the wearer based on the light exiting points at the center of the waveguide plate.

This embodiment is also described as adjusting the deflecting angle of the waveguide plate, but the method of adjusting the deflecting angle of the waveguide plate is to deflect around the light exiting point at the center of the waveguide plate. As shown in FIG. 2, DF and EG are the widths of the two waveguide plates, B and C are the light exiting points at the centers of DF and EG, respectively, DE is the minimum distance between the two waveguide plates, A is the virtual image point, AB and AC are the target virtual image distance, a is the light exiting angle of the waveguide plate, and c is the target deflecting angle of the waveguide plate. In this embodiment, since the light exiting points at the centers of the waveguide plates is the rotating center of deflecting, the deflecting angles of the two waveguide plates are the same, the first distance BC between the light exiting points at the centers of the two waveguide plates is a constant and is a known value. In addition, a and AB are both known values, and c may be calculated according to a, AB and BC. Since cos b=BO/AB, and b=180°−a−c, BO=0.5BC, cos (180°−a−c)=0.5BC/AB, c may be calculated according to these formulas.

After calculating the target deflecting angle c of the waveguide plate, the waveguide plate DF can be controlled to deflect by the target deflecting angle c towards the eye of the wearer based on the light exiting point B at the central of the waveguide plate, and the waveguide plate EG can be controlled to deflect by the target deflecting angle c towards the eye of the wearer based on the light exiting point C at the central of the waveguide plate.

In this embodiment, the adjustment of the virtual image distance is realized by adjusting the deflecting angle of the waveguide plate according to the target diopter.

Further, the third embodiment of the focal length adjustment method for AR glasses of the application is provided based on the first embodiment. In this embodiment, the display module includes an optical engine.

The above step S40 includes the following steps.

Step B1, determining the target virtual image distance according to the target diopter.

Step B2, determine the target deflecting angle of the optical engine according to the target virtual image distance, and adjusting the optical engine according to the target deflecting angle.

After determining the target diopter, calculating the reciprocal of the target diopter, the reciprocal is the target virtual image distance. In order to allow the images projected and displayed by the display module to be clearly display on the wearer's retina, it is necessary to make the virtual image distance of the image projected and displayed by the display module equal to the target virtual image distance. The adjustment of the virtual image distance of the image projected and displayed by the display module may be realized by adjusting the deflecting angle of the optical engine.

Furthermore, the display module includes two waveguide plates, and the above step B2 includes the following steps.

Step B21, determining the first distance between the light exiting points at the centers of the two waveguide plates and the deflecting angles of the waveguide plates.

Step B22, determining the target deflecting angle of the optical engine according to the first distance, the deflecting angles and the target virtual image distance.

Step B23, adjusting the optical engine according to the target deflecting angle.

This embodiment is for the case of adjusting the deflecting angle of the optical engine. Similar to the second embodiment, referring to FIG. 2, in this case, since the waveguide plate maintains its original angle, c is a known value. Since the light exiting angle of the waveguide plate is the same as the deflecting angle of the optical engine, a is an unknown value to be calculated. In addition, AB and BC are known values, a may be calculated according to c, AB and BC. Since cos b=BO/AB and b=180°−a−c, BO=0.5BC, cos (180°−a−c)=0.5BC/AB, and a may be calculated according to these formulas.

After a is calculated, the optical engine may be controlled to deflect by the deflecting angle.

In this embodiment, the adjustment of the virtual image distance is realized by adjusting the deflecting angle of the optical engine according to the target diopter.

Further, the fourth embodiment of the focal length adjustment method for AR glasses of the present application is provided based on at least one of the first embodiment, the second embodiment and the third embodiment. In the fourth embodiment, after the above step S40, the focal length adjustment method for AR glasses further includes the following steps.

Step S50, capturing a second image of the preset circle in the eye of the wearer of the AR glasses through the camera to obtain a second captured image, and determining a second imaging radius of the preset circle in the second image according to the second captured image.

Step S60, if the difference between the second imaging radius and the preset reference radius is greater than or equal to the preset error threshold, determining the second diopter according to the second imaging radius and the preset reference radius, determining the second deflecting angle of the display module according to the second diopter, and adjusting the display module according to the second deflecting angle until the difference between the second imaging radius and the preset reference radius is less than the preset error threshold.

In this embodiment, in order to ensure the adjustment validity and guarantee the adjustment accuracy, after adjusting the deflecting angle of the display module, capturing the second image of the preset circle in the eye of the wearer of AR glasses by the camera to obtain the second image, and then determining the second imaging radius of the preset circle in the second image according to the second captured image in the same way as in the first embodiment. If the difference between the second imaging radius and the preset reference radius is greater than or equal to the preset error threshold, it means that the virtual image distance has not been validly adjusted. In order to ensure that the wearer can see a clear image, and it is necessary to repeat the steps similar to the previous embodiments, i.e., determining the deflecting angle of the display module again, and adjusting the display module again according to the newly determined deflecting angle, and after the adjustment, determining whether the difference between the imaging radius and the preset reference radius is adjusted to be less than the preset error threshold, through camera capturing. If it is not less than the preset error threshold, it needs to adjust the display module again. If it is less than the preset error threshold, no further adjustment is required.

In addition, the embodiment of the present application also provides a focal length adjustment device for AR glasses, which includes: a display module for receiving the focal length adjustment command and displaying the preset circle with the preset reference radius; a capturing module for capturing the first image of the preset circle in the eye of the wearer of AR glasses through a camera to obtain a first captured image, and determining a first imaging radius of the preset circle in the first image according to the first captured image; a diopter determination module for determining the target diopter of the eye of the wearer according to the preset reference radius and the first imaging radius; and an adjustment module configured to determine the target deflecting angle of the display module according to the target diopter, and to adjust the display module according to the target deflecting angle.

The further contents of the specific embodiments of the focal length adjustment device for AR glasses in the application are substantially the same as those of the above embodiments of the focal length adjustment method for AR glasses, and will not be described herein once again.

In an embodiment, the focal length adjustment device for AR glasses in the present application may include a structural housing, a Bluetooth communication module, a main control module, a display module, a camera, a loudspeaker, a microphone, a memory, etc. The main control module may include a microprocessor, a power supply, a power management unit, sensors required by the system and other active or passive components and the like (which can be replaced, deleted or added according to actual functions). The memory may store the focal length adjustment program for AR glasses, and the microprocessor may call the focal length adjustment program for AR glasses stored in the memory and perform the following operations: receiving a focal length adjustment command, and displaying a preset circle with a preset reference radius through the display module; capturing a first image of the preset circle in the eye of the wearer for the AR glasses through the camera to obtain a first captured image, and determining a first imaging radius of the preset circle in the first image according to the first captured image; determining the target diopter of the eye of the wearer according to the preset reference radius and the first imaging radius; and determining the target deflecting angle of the display module according to the target diopter, and adjusting the display module according to the target deflecting angle.

Further, the microprocessor may also call the focal length adjustment program for AR glasses stored in the memory to perform the following operations: determining the target virtual image distance according to the target diopter; and determining the target deflecting angle of the waveguide plate according to the target virtual image distance, and adjusting the waveguide plate according to the target deflecting angle.

Further, the microprocessor may also call the focal length adjustment program for AR glasses stored in the memory to perform the following operations: determining the minimum distance between the two waveguide plates, the widths of the waveguide plates, and the light exiting angles of the waveguide plates; determining the target deflecting angle of the waveguide plates according to the minimum distance, the width, the light exiting angle and the target virtual image distance; and controlling the waveguide plates to deflect by the target deflecting angle towards the eye of the wearer based on the proximal ends of the waveguide plates. Here, the proximal ends of the waveguide plates are respective nearer ends of either of the waveguide plates to the other of the waveguide plates.

Further, the microprocessor may also call the focal length adjustment program for AR glasses stored in the memory to perform the following operations: determining the first distance between the light exiting points at the centers of the two waveguide plates and the light exiting angles of the waveguide plates; and determining the target deflecting angle of the waveguide plates according to the first distance, the light exiting angles and the target virtual image distance; and controlling the waveguide plates to deflect by the target deflecting angle towards the eye of the wearer based on the light exiting points at the centers of the waveguide plates.

Further, the microprocessor may also call the focal length adjustment program for AR glasses stored in the memory to perform the following operations: determining the first distance between the light exiting points at the centers of the two waveguide plates and the deflecting angles of the waveguide plates; determining the target deflecting angle of the optical engine according to the first distance, the deflecting angles and the target virtual image distance; and adjusting the optical engine according to the target deflecting angle.

Further, the microprocessor may also call the focal length adjustment program for AR glasses stored in the memory to perform the following operations: capturing a second image of the preset circle in the eye of the wearer of the AR glasses through the camera to obtain a second captured image, and determining a second imaging radius of the preset circle in the second image according to the second captured image; if the difference between the second imaging radius and the preset reference radius is greater than or equal to the preset error threshold, determining the second diopter according to the second imaging radius and the preset reference radius, determining the second deflecting angle of the display module according to the second diopter, and adjusting the display module according to the second deflecting angle until the difference between the second imaging radius and the preset reference radius is less than the preset error threshold.

In addition, the embodiment of the present application also provides a computer readable storage medium in which the focal length adjustment program for AR glasses is stored. Here, the focal length adjustment program for AR glasses, when executed by the processor, implements steps of the focal length adjustment method for AR glasses described above are implemented.

All embodiments of the focal length adjustment apparatus and computer readable storage medium for AR glasses of the present application may corresponding to each embodiment of the focal length adjustment method for AR glasses of the present application, which will not be repeated herein once again.

It should be understood that, in the text, the terms "including", "comprising" or any other variant thereof are intended to cover non-exclusive inclusion, so that a process, method, article or device including a series of elements not only includes those elements, but also includes other elements not explicitly listed, or also includes elements inherent to such process, method, article or device. Without further limitation, the element defined by the statement "including one . . . " does not exclude the existence of another identical element in the process, method, article or device including the element.

The serial number of the embodiments of the present application is only for description and does not represent the advantages and disadvantages of the embodiments.

Through the above descriptions of the embodiments, those skilled in the art can clearly understand that the method of the above embodiments can be implemented by means of software and the necessary general hardware platform, of course, it also can be implemented by means of hardware, but in many cases the former is a better embodiment. Based on such understanding, the technical solution of the present application, or the part that contributes to the prior art, can be embodied in the form of a software product, which is stored in a storage medium (such as ROM/RAM, magnetic disc, optical disc), and a plurality of commands are included to enable one terminal device (which can be a mobile phone, a computer, a server, an air conditioner, or a network device, etc.) to execute the methods described in various embodiments of the present application.

The above is only the preferred embodiment of the present application, and does not limit the scope of the patent of the present application. Any equivalent structure or equivalent process transformation made by using the description of the present application and the accompanying drawings, or direct or indirect application in other related technical fields, are similarly included in the scope of patent protection of the present application.

What is claimed is:

1. A focal length adjustment method for AR glasses, wherein the focal length adjustment method for AR glasses is applied to AR glasses, and
wherein the AR glasses comprising a display module and a camera, the focal length adjustment method for AR glasses comprises:
receiving a focal length adjustment command, and displaying a preset circle with a preset reference radius through the display module;
capturing a first image of the preset circle in an eye of a wearer of the AR glasses through the camera to obtain a first captured image, and determining a first imaging radius of the preset circle in the first image according to the first captured image;
determining target diopter of the eye of the wearer according to the preset reference radius and the first imaging radius; and
determining a target deflecting angle of the display module according to the target diopter, and adjusting the display module according to the target deflecting angle.

2. The focal length adjustment method for AR glasses according to claim 1, wherein the display module comprises two waveguide plates, and
wherein determining a target deflecting angle of the display module according to the target diopter, and adjusting the display module according to the target deflecting angle comprises:
determining a target virtual image distance according to the target diopter; and
determining a target deflecting angle of the waveguide plates according to the target virtual image distance, and adjusting the waveguide plates according to the target deflecting angle.

3. The focal length adjustment method for AR glasses according to claim 2, wherein determining a target deflecting angle of the waveguide plates according to the target virtual image distance, and adjusting the waveguide plates according to the target deflecting angle comprises:
determining a minimum distance between the two waveguide plates, widths of the waveguide plates, and light exiting angles of the waveguide plates;
determining the target deflecting angle of the waveguide plates according to the minimum distance, the widths, the light exiting angles and the target virtual image distances; and
controlling the waveguide plates to deflect by the target deflecting angle towards the eye of the wearer based on proximal ends of the waveguide plates, wherein the proximal ends of the waveguide plates are respective nearer ends of either of the waveguide plates to the other of the waveguide plates.

4. The focal length adjustment method for AR glasses according to claim 2, wherein determining a target deflecting angle of the waveguide plates according to the target virtual image distance, and adjusting the waveguide plates according to the target deflecting angle comprises:
determining a first distance between central light exiting points of the two waveguide plates and light exiting angles of the waveguide plates;
determining the target deflecting angle of the waveguide plates according to the first distance, the light exiting angles and the target virtual image distance; and
controlling the waveguide plates to deflect by the target deflecting angle towards the eye of the wearer based on the central light exiting point of the waveguide plate.

5. The focal length adjustment method for AR glasses according to claim 1, wherein the display module comprises an optical engine, and
wherein determining a target deflecting angle of the display module according to the target diopter, and adjusting the display module according to the target deflecting angle comprises:
determining a target virtual image distance according to the target diopter; and
determining a target deflecting angle of the optical engine according to the target virtual image distance, and adjusting the optical engine according to the target deflecting angle.

6. The focal length adjustment method for AR glasses according to claim 5, wherein the display module comprises two waveguide plates, and
   wherein determining a target deflecting angle of the optical engine according to the target virtual image distance, and adjusting the optical engine according to the target deflecting angle comprises:
   determining a first distance between central light exiting points of the two waveguide plates and deflecting angles of the waveguide plates;
   determining a target deflecting angle of the optical engine according to the first distance, the deflecting angles and the target virtual image distance; and
   adjusting the optical engine according to the target deflecting angle.

7. The focal length adjustment method for AR glasses according to claim 1, wherein, after determining a target deflecting angle of the display module according to the target diopter, and adjusting the display module according to the target deflecting angle, the focal length adjustment method for AR glasses further comprises:
   capturing a second image of the preset circle in the eye of the wearer of the AR glasses through the camera to obtain a second captured image, and determining a second imaging radius of the preset circle in the second image according to the second captured image; and
   if a difference between the second imaging radius and the preset reference radius is greater than or equal to a preset error threshold, determining a second diopter according to the second imaging radius and the preset reference radius, determining a second deflecting angle of the display module according to the second diopter, and adjusting the display module according to the second deflecting angle until the difference between the second imaging radius and the preset reference radius is less than the preset error threshold.

8. A focal length adjustment apparatus for AR glasses, wherein the focal length adjustment apparatus for AR glasses comprises a memory, a processor, and a focal length adjustment program for AR glasses stored in the memory and operable on the processor, and wherein the focal length adjustment program for AR glasses when executed by the processor, implements steps of the focal length adjustment method for AR glasses according to claim 1.

9. A computer readable storage medium, wherein a focal length adjustment program for AR glasses is stored in the computer readable storage medium, and wherein the focal length adjustment program for AR glasses, when executed by a processor, implements steps of the focal length adjustment method for AR glasses according to claim 1.

* * * * *